Aug. 6, 1946.  J. A. WEAVER  2,405,247
GAUGE FOR SPHERICAL CONTAINERS
Filed Nov. 14, 1945   2 Sheets-Sheet 1
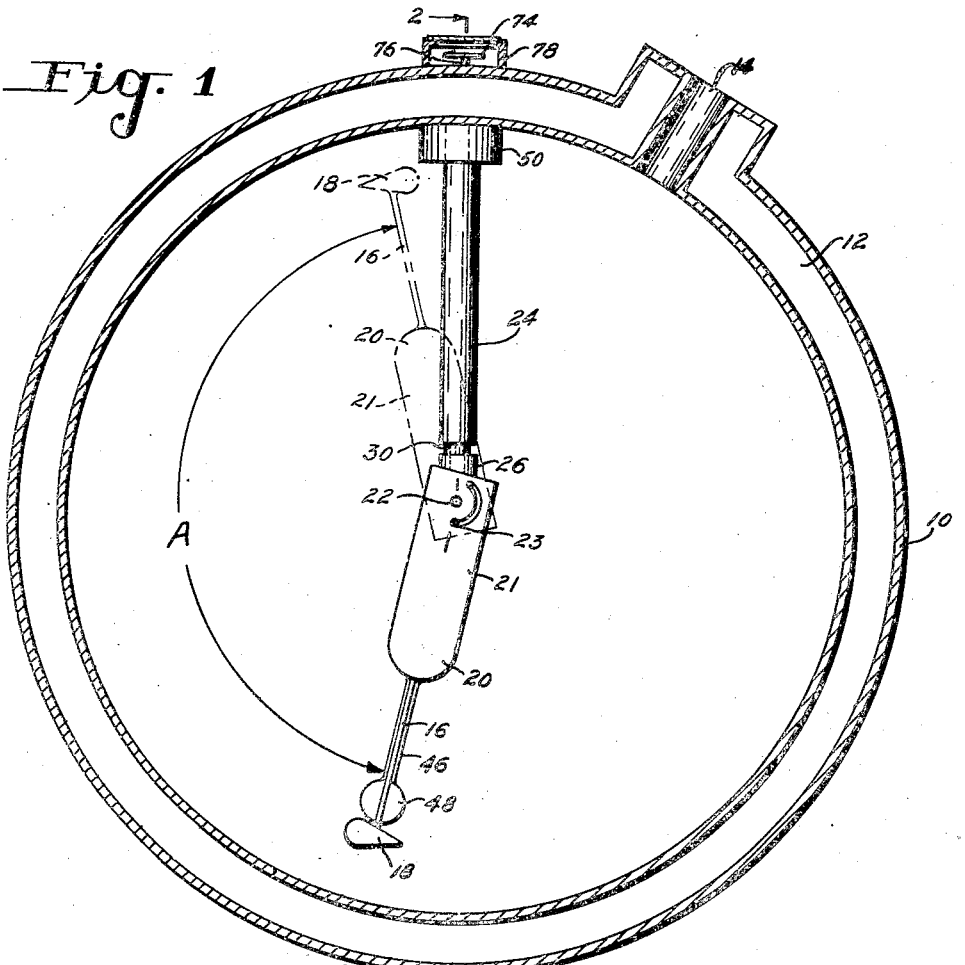
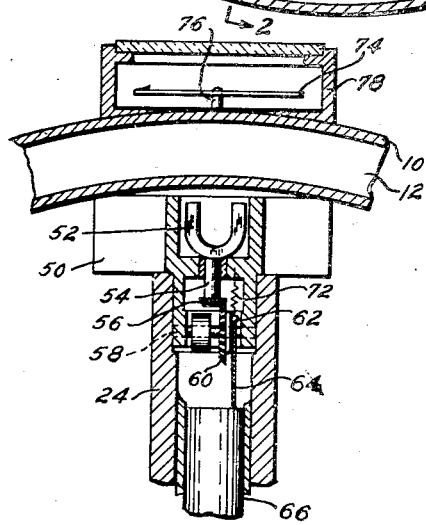
INVENTOR.
JOHN A. WEAVER
BY
ATTORNEYS Aug. 6, 1946.   J. A. WEAVER   2,405,247
GAUGE FOR SPHERICAL CONTAINERS
Filed Nov. 14, 1945   2 Sheets-Sheet 2
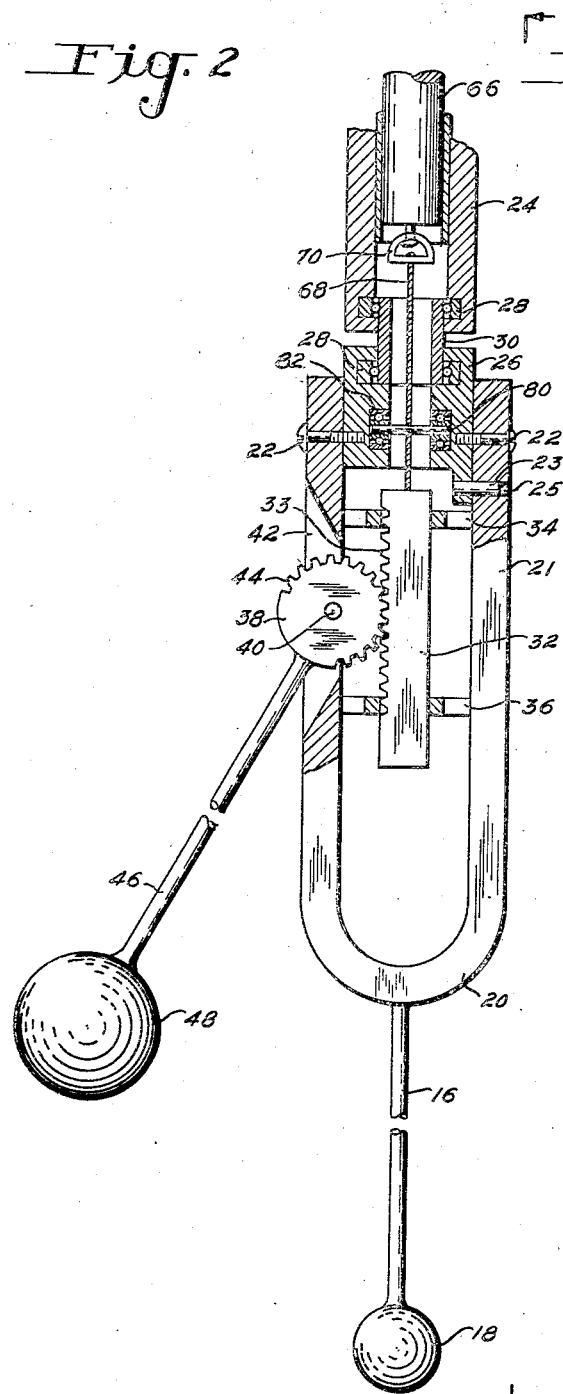
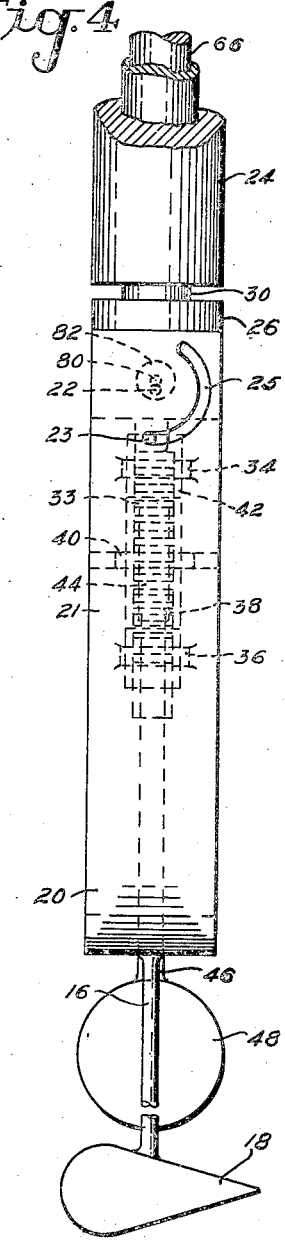
INVENTOR
JOHN A. WEAVER
BY
ATTORNEYS Patented Aug. 6, 1946

2,405,247

UNITED STATES PATENT OFFICE 2,405,247

GAUGE FOR SPHERICAL CONTAINERS

John A. Weaver, Santa Monica, Calif.

Application November 14, 1945, Serial No. 628,645

7 Claims. (Cl. 73—318)

(Granted under the act of March 3, 1883, as amended April 30, 1928; 370 O. G. 757)

The invention described herein may be manufactured and used by or for the Government for governmental purposes without payment to me of any royalty thereon.

This invention relates to liquid level gauges and is particularly applicable to spherical containers.

Liquid containers have heretofore been provided with gauges which have a fixed reference to the container whereby the container must necessarily maintain substantially a fixed relation to gravity if accurate measurement of the liquid level is to be indicated.

It is therefore an object of the invention to provide a spherical container with a level indicating means which is secured in fixed relation with reference to the outer surface of the sphere but with level measuring means within the container which automatically adjusts itself to the gravity axis of the sphere in substantially any position to which the fixed point on its surface may be turned with respect to gravity.

Other objects and advantages will become apparent as the invention is further described with reference to the drawings, wherein:

Fig. 1 is an axial section through a spherical container equipped with a fluid level gauge mechanism embodying the principles of my invention.

Fig. 2 is a view of a portion of the level measuring mechanism taken to an enlarged scale on a line 2—2 of Fig. 1.

Fig. 3 shows the level indicating portion of the device which is fixed to the surface of the sphere.

Fig. 4 is a view similar to Fig. 2 but taken on the line 4—4 of Fig. 2.

Like reference characters refer to like parts throughout the several views.

Referring now to the drawings, a double wall spherical container 10 has a vacuum space 12 and an opening 14 through which it may be filled and emptied. A pendulum 16 carries a streamlined weight 18 at its lower end and its upper end forks at 20, the ends 21 of the fork being provided with hinge pins 22.

A tubular pendulum support 24 has its outer end fixed to a selected point on the inside surface of the spherical container, the support extending inwardly toward the center of the sphere and being provided at its inner end with a pendulum hinge support 26. Bracket 26 is freely rotatable with respect to the support 24 on antifriction bearings 28—28, the outer races of these radial and thrust bearings being carried one in the support 24 and one in the bracket 26 the inner races of the two bearings being formed on a single sleeve 30, whereby the bracket may rotate with respect to the support 24 and consequently with respect to the sphere 10 through 360°.

Hinge pins 22 extend through the prongs 21 of the pendulum fork into the hinge bracket 26, a pin 23 in the bracket extending through an arcuate slot 25 in the fork, whereby the pendulum 16 is free to swing through angle "A" which is at least 170° as shown in Fig. 1. The axis of the hinge pins 22 and the axis of the pendulum hinge bracket support 26 should be normal to each other and should lie in the same plane and both axes should pass through the center of the sphere 10.

A rack member 32 having teeth 33 is slidable lengthwise in bearing supports 34 and 36 carried by the fork ends 21. A pinion 38 is rotatable on a shaft 40 carried in a recess 42 in one of the fork ends 21, the pinion having teeth 44 in mesh with the rack teeth 33.

A float arm 46 has one end fixed to the pinion 38 and at the free end carries a float 48. Obviously as long as the pendulum 16 may assume a vertical position the float 48 will assume a given position for a given quantity of liquid whether the tubular support is vertical, horizontal or at some other angle.

The outer end of pendulum support 24 carries a base 50 whereby it is secured to the inner surface of the spherical container. A U-shaped magnet 52 is carried on the outer end of a shaft 54, the inner end of the shaft being provided with a bevel pinion 56. A shaft 58 carries a bevel gear 60 in mesh with the bevel pinion 56. A pin 62 in the side of the gear 60 is operated by a connecting rod 64, the free end of which is connected to one end of an actuating rod 66, the other end of the actuating rod 66 being connected by a flexible linkage 68 to the rack member 32. A swivel 70 permits free relative rotation between the flexible linkage 68 and the operating rod 66. A counterweight spring 72 exerts an upward force on the pin 62 to counter balance the weight of the actuating rod 66, the connecting rod 64 and the linkage 68 and maintains flexible linkage 68 taut.

A polarized needle 74 is pivoted at 76 in a casing 78 which is fast on the outside of the container 10 whereby, when the magnet 52 is rotated the needle 74 will be correspondingly rotated.

A small roller 80 is rotatable on antifriction bearings 82 held in the bracket 26. The axis of roller 80 is offset from the axis of the hinge pins 22 a distance of one fourth the circumference of the roller which is an amount just sufficient that when the angle "A" is progressively decreased from 170°, the flexible linkage 68 will wrap around the roller 80 without moving the actuating rod 66 relative to the tubular support 24.

It will be seen that if the container 10 is rolled until the angle "A" is decreased to say 40°, the axis of the pendulum 16 will still be on the gravity axis and the needle 74 will not have been moved, but if the level of the liquid is changed, the float 48 will rise or fall, thus operating the rack 32, linkage 68, actuating rod 66, connecting rod 64, thus through the bevel gears 60 and 56, rotating the needle 74 and thereby indicating the change in level.

Having described an embodiment of my invention, I claim:

1. A liquid level gauge for a spherical container which comprises a polarized needle pivotally supported on the outside of said container, a magnet within said container having its poles revolvable about the axis of said needle, a rotatable pendulum hinge support carried within said container with the axis of rotation passing through the center of said container, a pendulum hinged on said pendulum hinge support, the hinge axis passing through the center of said container and being normal to the axis of rotation of said pendulum hinge support, a float, a float arm for said float, hingedly carried on said pendulum with hinge axis normal to the gravity axis, and linkage connecting said float arm to said magnet whereby swinging movement of said float arm causes rotation of said magnet.

2. A liquid level gauge for a spherical container which comprises a polarized needle rotatably supported on the outside of said container, a magnet close to the wall within said container having parallel poles revolvable about an axis midway of said poles and parallel thereto, said axis being coincident with the axis of said needle and said container, a rotatable pendulum hinge support carried within said container with the axis of rotation passing through the center of said container, a pendulum hinged on said pendulum hinge support, the hinge axis passing through the center of said container and being normal to the axis of rotation of said support, a float, a float arm hingedly carried on said pendulum with hinge axis normal to the gravity axis, and mechanical linkage connecting said float arm to said magnet whereby swinging movement of said float arm about its hinge causes rotation of said magnet about its axis, whereby said polarized needle is rotated.

3. A liquid level gauge for a spherical container which comprises a polarized needle pivotally supported on the outside of said container, a magnet within said container having its poles rotatable about the axis of said needle, a pendulum support extending inwardly from the wall of said container and carrying at its inner end a rotatable pendulum hinge support having its axis of rotation passing through the center of said container, a pendulum hinged on said pendulum hinge support, the hinge axis of said pendulum passing through the center of said container and being normal to the axis of rotation of said pendulum hinge support, a float, a float arm hingedly carried on said pendulum with hinge axis normal to the gravity axis, and a mechanical linkage connecting said float arm to said magnet whereby swinging movement of said float arm causes rotation of said magnet.

4. A liquid level gauge for a spherical container which comprises a needle pivotally supported on the outside of said container, rotation imparting means within said container rotatable about the pivot axis of said needle adapted to impart rotation to said needle, a rotatable pendulum hinge support carried within said container with the axis of rotation coincident with the pivot axis of said needle and passing through the center of said container, a pendulum hinged on said pendulum hinge support, the hinge axis passing through the center of said container and being normal to the axis of rotation of said support, a float, a float arm hingedly carried on said pendulum with hinge axis normal to the gravity axis, and a mechanical linkage connecting said float arm to said rotation imparting means whereby swinging movement of said float arm causes rotation of said rotation imparting means.

5. For applying a liquid level gauge to a spherical container, the combination of a hollow pendulum support fastened at the outer end to the inner wall of the container, the free end extending toward the center of the container, gauge operating means within said support adjacent the wall of said container, a pendulum hinge support rotatable on the inner end of said pendulum support, the axis of rotation of said pendulum hinge support passing through the center of said spherical container, a pendulum hinged to said pendulum hinge support, the hinge axis of said pendulum being normal to the axis of rotation of said pendulum hinge support and passing through the center of said spherical container, a float, a float arm for said float hinged to said pendulum, the hinge axis of said float arm being normal to the hinge axis of said pendulum, a linkage extending from said gauge operating means axially through said hollow pendulum support to said float arm constructed and arranged so that changing the level of said float operates said linkage axially in said hollow pendulum support, a flexible member in said linkage where it bends when the pendulum turns on its hinge axis, and a roller axially parallel to, but offset from, said hinge axis over which said flexible linkage may bend.

6. The device of claim 5 wherein the axis of said roller is offset in the direction of said gauge operating means with respect to the hinge axis of said pendulum.

7. The device of claim 5 wherein the axis of said roller is offset in the direction of said gauge operating means a distance of one fourth the circumference of said roller.

JOHN A. WEAVER.